United States Patent [19]

Dehar

[11] 3,711,125
[45] Jan. 16, 1973

[54] QUICK CONNECT FITTING FOR A HYDRAULIC CONDUIT

[75] Inventor: David C. Dehar, Dearborn Heights, Mich.

[73] Assignee: Ford Motor Company, Dearborn, Mich.

[22] Filed: June 29, 1971

[21] Appl. No.: 157,921

[52] U.S. Cl..................................285/111, 285/319
[51] Int. Cl...............................................F16l 17/00
[58] Field of Search.......285/DIG. 22, 319, 320, 374, 285/111, 375

[56] References Cited

UNITED STATES PATENTS

| | | | |
|---|---|---|---|
| 809,759 | 1/1906 | Toole et al.................. | 285/374 X |
| 763,317 | 6/1904 | Nelson........................ | 285/320 |
| 921,691 | 5/1909 | Friday......................... | 285/319 X |

FOREIGN PATENTS OR APPLICATIONS 444,769  5/1927  Germany............................285/111

Primary Examiner—Dave W. Arola
Attorney—Keith L. Zerschling et al.

[57] ABSTRACT

A quick connect fitting for establishing a connection between a pressurized fluid conduit and a communicating fluid passage comprising a sleeve, a collar surrounding the sleeve, said sleeve encircling one end of said conduit and providing a seal retaining groove, said collar and said sleeve having interlocking parts whereby said collar and said tube end may be held in place as said seal is urged into engagement with a cooperating sealing surface in said collar.

4 Claims, 4 Drawing Figures

INVENTOR:
DAVID C. DEHAR
BY:
ATTORNEYS.

INVENTOR:
DAVID C. DEHAR
BY:
ATTORNEYS.

QUICK CONNECT FITTING FOR A HYDRAULIC CONDUIT

GENERAL DESCRIPTION OF THE INVENTION

My invention is adapted to be used for fastening pressurized fluid transmission tubes to a fluid retaining chamber. It may be used, for example, for connecting fluid conduits to an oil cooler for an automotive power transmission mechanism in an automotive vehicle driveline.

The invention comprises a fitting having a lip type oil seal which is retained prior to assembly within a sleeve that may be inserted over the end of the fluid pressure transmission tube. The tube is upset to form a shoulder which is adapted to register with an internal groove formed in the sleeve thereby holding the sleeve axially fast with respect to the tube. After assembly the sleeve and the collar within which it is received are formed with interlocking tab and groove elements which register with each other when the sleeve is pushed into the collar to effect sealing engagement of the seal within the end of the collar. The collar in turn surrounds the opening formed in the fluid chamber such as a liquid-to-liquid heat exchanger or liquid-to-air radiator core.

This fitting design makes possible rapid assembly and disassembly while maintaining an effective fluid seal even when the fluid itself is pressurized to moderate pressure levels. The use of my improved fitting avoids the necessity for using special hand tools and makes it possible to use fluid connections at locations that otherwise would be inaccessible in installations that would include, for example, oil coolers of the type discussed here.

PARTICULAR DESCRIPTION OF THE INVENTION

Figure 1:
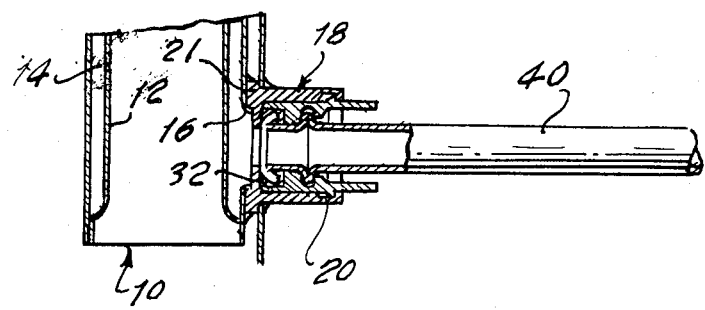
FIG. 1 shows a cross sectional assembly view of an oil cooler for use with a power transmission mechanism in an automotive vehicle driveline together with the improved fitting of my invention.

In FIG. 1 reference character 10 designates generally an oil-to-oil cooler. It includes a first coolant passage 12 and an annular oil passage 14. The passage 14 is defined by concentrically related tubes, one of which is the inner tube 12 and the other of which is the surrounding tube in which is formed an inlet port 16. The improved fitting of my invention is generally indicated by reference character 18.

Figure 2:
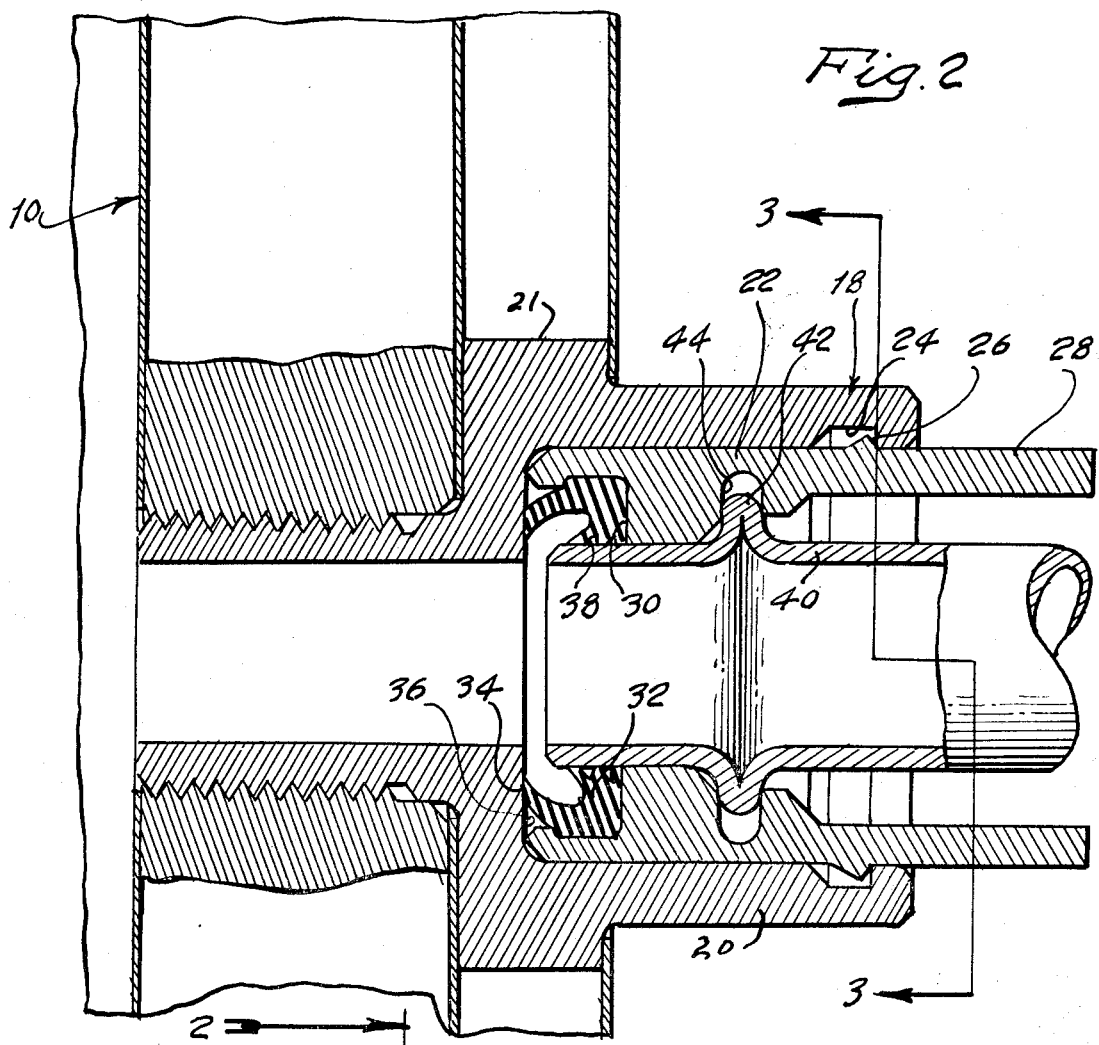
FIG. 2 is an enlarged view of a fitting similar to the one shown in FIG. 1 as seen from the plane of section line 2—2 of FIG. 3.
Figure 3:
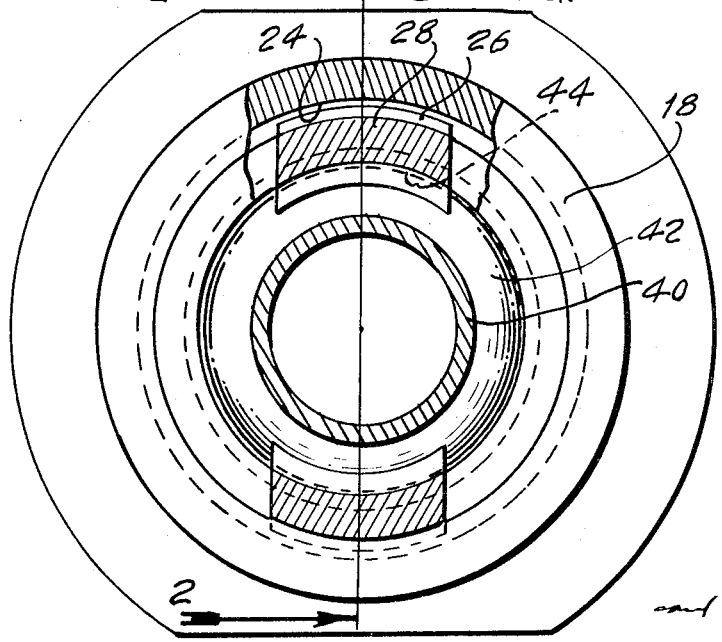
FIG. 3 is an end view of the structure of FIG. 2 as seen from the plane of section line 3—3 of FIG. 2.

The fitting 18 includes a cylindrical collar 20 having a peripheral flange 21. It is positioned around the port 16 and is held fast to the outer radiator tube by welding. A cylindrical sleeve 22 is adapted to be received within the collar 18. As indicated in FIG. 2, collar 20 is formed with an internal groove 24 which is adapted to register with tabs 26 formed on fingers or clips 28 extending from the cylindrical sleeve 22.

When the clips 28 are pressed toward each other, the tabs 26 move out of registry with respect to the groove 24 thereby permitting the sleeve 22 to be inserted and withdrawn.

The innermost end of the sleeve 18 is formed with an annular valve recess 30 in which is positioned a flexible seal 32. In the embodiment of FIG. 2, the seal is of the lip type and includes a lip 34 that engages an annular wall 36 which forms a part of the collar 28. Annular wall 36 surrounds the port 16. Seal 32 is provided also with a sealing lip 38 which engages the outer periphery of a fluid transmitting tube 40.

The tube 40 is formed with a shoulder 42 which is adapted to register with a cooperating groove 44 formed in the interior of the sleeve 22.

During assembly the sleeve 22 is inserted over the end of the tube 40 until shoulder 42 snaps into registry with the groove 44. The seal 32 is placed in the recess 30 before the sleeve 22 is moved over the end of the tube 40. The clips 28 then are depressed thereby permitting the end of the tube and the sleeve 22 to be inserted within the collar 18. When the sleeve is fully inserted, the seal 22 establishes sealing engagement with the annular wall 36 and with the periphery of the tube 40. As the collar 22 exerts pressure on the seal 32, the sealing force of the sealing surfaces for the seal 32 is increased.

The seals are designed so that the sealing effect will increase upon an increase in the pressure in the tube 40. The hydrostatic forces applied to the seal complement the mechanical forces acting thereon due to the pressure applied with the sleeve 22.

Figure 4:
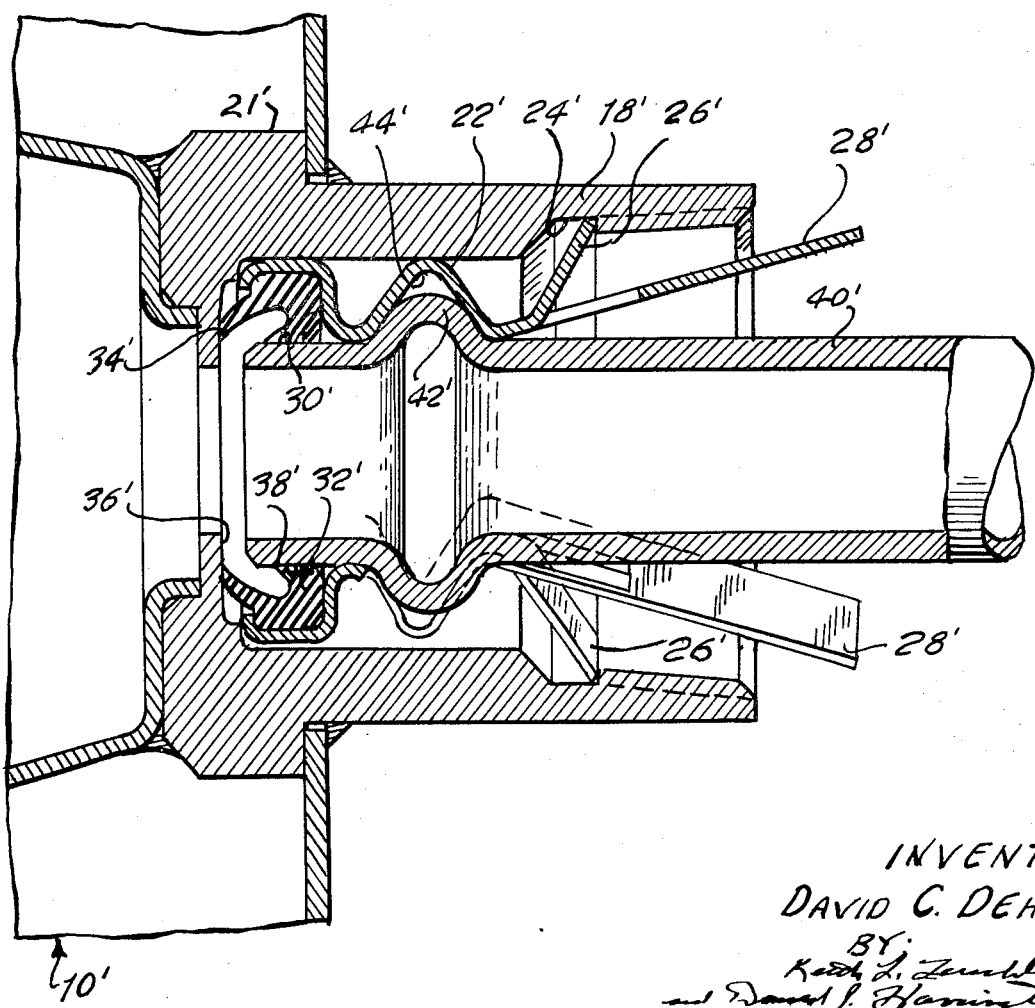
FIG. 4 is an alternate construction that is similar in function to the construction of FIG. 2.

In FIG. 4 I have shown an alternate embodiment of the fitting of my invention. The fitting of FIG. 4 is similar in construction and in function to the fitting of FIG. 2. It includes elements that are common to the construction of FIG. 2, and these elements have been identified by similar reference characters although prime notations have been added.

In the embodiment of FIG. 4, the sleeve 22' includes a plurality of clips 28' which extend outwardly from a collar 18'. The clips 28' form a part of the sleeve 22', and they are adapted to be depressed thereby permitting disengagement of the tabs 26' with respect to the groove 24'. The collar 22' is formed of sheet metal although the sleeve 22 of the FIG. 2 embodiment may be formed of plastic such as nylon.

The end of the tube 40' is formed with an upset shoulder 42' which is adapted to register with internal shoulder 44' on the sleeve 22'. As in the embodiment of FIG. 2, the seal 32' of the FIG. 4 construction is assembled in place within the sleeve 22' before the sleeve is inserted over the ends of the tube 40'. The sleeve and the tube then are inserted within the collar 18' until the end of the seal 32' engages the annular shoulder 36'.

Having thus described preferred embodiments of my invention, what I claim and desire to secure by U.S. Letters Patent is:

1. A fluid fitting for establishing a fluid-tight connection between a pressurized fluid pressure transmission tube and a companion member, said member having a fluid passageway formed therein, a collar connected to said companion member, said collar having a sealing shoulder surrounding the margin of said passageway and an internal recess, a central opening in said collar, a retainer sleeve of generally circular cross section adapted to be received within said central opening, a seal retaining cavity defined by said retainer sleeve at one end thereof, a seal in said cavity in sealing engagement with said sealing shoulder when said sleeve is received within said central opening, said pressurized fluid pressure transmission tube being received within said sleeve, a shoulder formed on said tube, an internal shoulder in said sleeve in registry with and receiving the shoulder on said tube thereby preventing axial movement of said tube relative to said sleeve, said seal engaging the margin of said tube, at least one retainer tab connected to said sleeve and registering with a wall of said internal recess when said sleeve is assembled within said collar thereby preventing disassembly of said connection, said tab moving out of registry with its associated recess when depressed radially inwardly thereby permitting quick assembly and disassembly of said connection.

2. A fluid fitting for establishing a fluid-tight connection between a pressurized fluid pressure transmission tube and a companion member, said member having a fluid passageway formed therein, a collar on said companion member, a circular sealing surface within said collar, an internal recess formed in said collar, a sleeve of generally circular cross section adapted to be received within said collar, a seal retaining cavity defined by said sleeve at one end thereof, a seal in said cavity, an internal recess formed in said sleeve, said pressurized fluid pressure transmission tube end being received within said sleeve, a shoulder formed on said tube end, an internal shoulder on said sleeve registry with and receiving the shoulder on said tube end thereby preventing axial movement of said tube relative to said sleeve, said seal engaging said tube end, said seal being adapted to sealingly engage said circular sealing surface when said sleeve is received within said collar, a retainer tab extending radially outwardly from said sleeve, a clip on said sleeve extending from said collar when said sleeve is assembled within said collar, said tab registering with a wall of said internal recess in said collar when said sleeve is assembled in place thereby preventing disassembly of said connection, said tab moving out of registry with its associated recess when said clip is depressed radially inwardly thereby permitting quick assembly and disassembly of said fitting.

3. The combination set forth in Claim 1 wherein said seal comprises two sealing positions, one of which registers in sealing engagement with the end of said tube and the other of which registers in sealing engagement with said collar, said seal being compressed within said seal cavity when said tube is assembled within said sleeve and when said sleeve is assembled within said collar thereby preventing leakage of fluid between said collar and said sleeve and between said tube and said collar.

4. The combination set forth in Claim 2 wherein said seal comprises two sealing positions, one of which registers in sealing engagement with the end of said tube and the other of which registers in sealing engagement with said collar, said seal being compressed within said seal cavity when said tube is assembled within said sleeve and when said sleeve is assembled within said collar thereby preventing leakage of fluid between said collar and said sleeve and between said tube and said collar.

* * * * *